(12) United States Patent  (10) Patent No.: US 8,885,267 B2
Kudoh  (45) Date of Patent: Nov. 11, 2014

(54) LENS BARREL AND IMAGE PICKUP APPARATUS

(75) Inventor: Tomoyuki Kudoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 13/071,288

(22) Filed: Mar. 24, 2011

(65) Prior Publication Data

US 2011/0242680 A1     Oct. 6, 2011

(30) Foreign Application Priority Data

Mar. 31, 2010  (JP) ................................. 2010-081921

(51) Int. Cl.
*G02B 15/14* (2006.01)
*G02B 7/10* (2006.01)
*G03B 17/04* (2006.01)

(52) U.S. Cl.
CPC ............... *G02B 7/102* (2013.01); *G03B 17/04* (2013.01)
USPC ............................ 359/700; 359/701; 359/808

(58) Field of Classification Search
USPC ......... 359/696–701, 808–809, 811–819, 822, 359/829–834; 348/208, 294, 335, 340, 348/373–374, 376
See application file for complete search history.

(56) References Cited

U.S. PATENT DOCUMENTS

| 6,011,659 A | * | 1/2000 | Onda ............................ 359/704 |
| 7,031,603 B2 | * | 4/2006 | Nomura ......................... 396/72 |
| 2003/0035228 A1 | * | 2/2003 | Takanashi ..................... 359/819 |
| 2008/0297924 A1 | | 12/2008 | Iijima |

FOREIGN PATENT DOCUMENTS

| JP | 2004-085934 | * | 1/2004 |
| JP | 2004-085934 | | 3/2004 |
| JP | 2009-009115 | | 1/2009 |
| JP | 2009009115 A | * | 1/2009 |

OTHER PUBLICATIONS

The above reference was cited in a Sep. 29, 2012 Chinese Office Action, which is enclosed with English Translation, that issued in Chinese Patent Application No. 201110080553.9.

\* cited by examiner

*Primary Examiner* — William Choi
*Assistant Examiner* — Sharrief Broome
(74) *Attorney, Agent, or Firm* — Cowan, Liebowitz & Latman, P.C.

(57) ABSTRACT

A lens barrel capable of keeping a stable zoom operation, increasing magnification of an image pickup apparatus with a simple configuration, and decreasing a camera thickness. A lens barrel is moved in an optical axis direction between a taking position and a retracted position to change magnification. A lens holding member holds a lens and has a follower part. A rectilinear movement regulating member regulates relative rotation of the lens holding member and has a convex part at an outside and a rectilinear rib at an image surface side than the convex part. A cam barrel has a cam groove for engaging the follower part and a groove for engaging the convex part formed on an inner surface. The cam barrel has a cam piece extended to the image surface side, a part of the cam groove is formed on an inner surface of the cam piece.

4 Claims, 10 Drawing Sheets

LENS BARREL AND IMAGE PICKUP APPARATUS

BACKGROUND OF THE INVENTION

1. Field of the Invention

The present invention relates to a lens barrel provided in image pickup apparatuses such as a film camera, a digital camera, etc. and to an image pickup apparatus provided with the lens barrel.

2. Description of the Related Art

Conventionally, there is a known lens barrel provided with a zoom drive mechanism that regulates rotations of lens holding frames that hold lenses, respectively, by a rectilinear barrel, engages cam followers formed on the lens holding frames with cam grooves formed on a cam barrel, and moves the lens holding frames by rotating the cam barrel to move the lenses to predetermined positions.

A demand to increase a magnification in recent years tends to increase the full length under an extended condition and to enlarge a lens barrel. On the other hand, there is a demand to minimize a camera thickness under a lens retracted condition.

Although a multiple connection of short lens barrels may be effective to decrease the camera thickness under the lens retracted condition, it is difficult because there are many limitations when cam grooves corresponding to the lens barrels are formed on a cam barrel without crossing.

Japanese Laid-Open Patent Publication (Kokai) No. 2004-085934 (JP 2004-085934A) suggests a lens barrel that has a cam barrel in which cam grooves having the same locus are formed at different positions in an optical axis direction and a circumferential direction and a rectilinear barrel in which cam followers are formed at different positions in the optical axis direction and the circumferential direction so as to engage with the respective cam grooves.

In this suggestion, since movement of a lens group guided by the rectilinear barrel in the optical axis direction can become longer than the length of the cam barrel in the optical axis direction, the length of the cam barrel in the optical axis direction can be shortened, which can decrease the camera thickness under the lens retracted condition.

Japanese Laid-Open Patent Publication (Kokai) No. 2009-9115 (JP 2009-9115A) suggests a technique that forms a cam groove on a projected part of a cam barrel that is projected toward an image surface side in an optical axis direction so as to increase a stroke of the cam groove in the optical axis direction in order to decrease the camera thickness under the lens-retracted condition.

However, in the technique of JP 2004-085934A, since a motion of the lens group guided by the rectilinear barrel in the optical axis direction becomes unstable when the cam follower of the rectilinear barrel is off the cam groove of the cam barrel, a zoom operation of the lens barrel may become unstable, as a result.

In the technique of JP 2009-9115A, since the lens barrel needs the rectilinear barrel that is arranged inside the cam barrel and a cylinder member that regulates rotation of the rectilinear barrel, i.e., needs three or more barrels, the configuration of the lens barrel becomes complicated and the technique cannot be applied to a two-barrel configuration.

SUMMARY OF THE INVENTION

The present invention provides a technique that can keep a stable zoom operation, increases magnification of an image pickup apparatus using a lens barrel with a simple configuration, and decreases a thickness of the image pickup apparatus under the lens retracted condition.

Accordingly, a first aspect of the present invention provides a lens barrel that is moved in an optical axis direction between a taking position and a retracted position by a zoom drive mechanism to change magnification, comprising a lens holding member configured to hold a lens and to have a follower part, a rectilinear movement regulating member configured as a barrel that regulates relative rotation of the lens holding member and configured to have a convex part at an outside and to have a rectilinear rib at an image surface side than the convex part, and a cam barrel configured to have a cam groove with which the follower part is engaged and a groove with which the convex part is engaged that are formed on an inner surface thereof, and configured to have a cam piece that is extended from an edge at the image surface side, a part of the cam groove being formed on an inner surface of the cam piece. The cam barrel moves in the optical axis direction while rotating relatively with respect to both of the lens holding member and the rectilinear movement regulating member. The lens holding member moves in the optical axis direction relatively with respect to the cam barrel by engagement of the follower part and the cam groove. The rectilinear movement regulating part moves in the optical axis direction together with the cam barrel by engagement of the convex part and the groove, and moves in the optical axis direction with respect to the cam barrel by engagement of the rectilinear rib and a cam piece.

Accordingly, a second aspect of the present invention provides an image pickup apparatus provided with the lens barrel according to the first aspect that is moved in an optical axis direction between the taking position and the retracted position by the zoom drive mechanism to change magnification.

The present invention can provide the technique that can keep the stable zoom operation, increases magnification of the image pickup apparatus using the lens barrel with a simple configuration, and decreases a thickness of the image pickup apparatus under the lens retracted condition.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
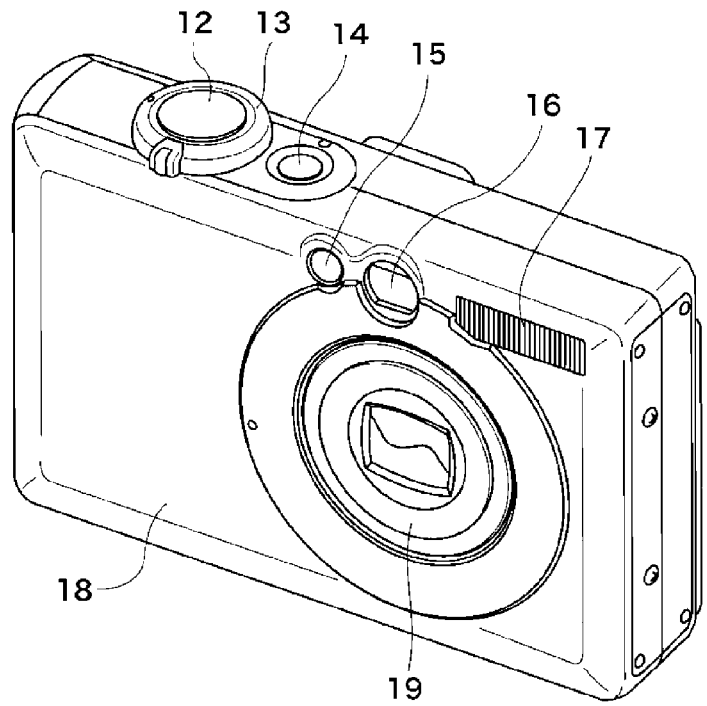
FIG. 1 is an external perspective view showing a digital camera seen from a front side under a power-off condition as an embodiment of an image pickup apparatus that is provided with a lens barrel according to the present invention.
Figure 2:
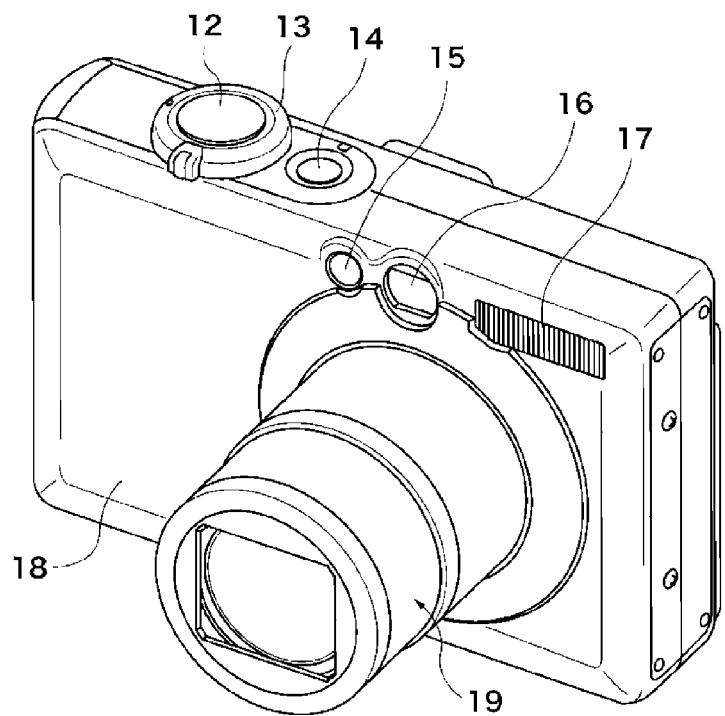
FIG. 2 is an external perspective view showing the digital camera shown in FIG. 1 under a power-on condition.
Figure 3:
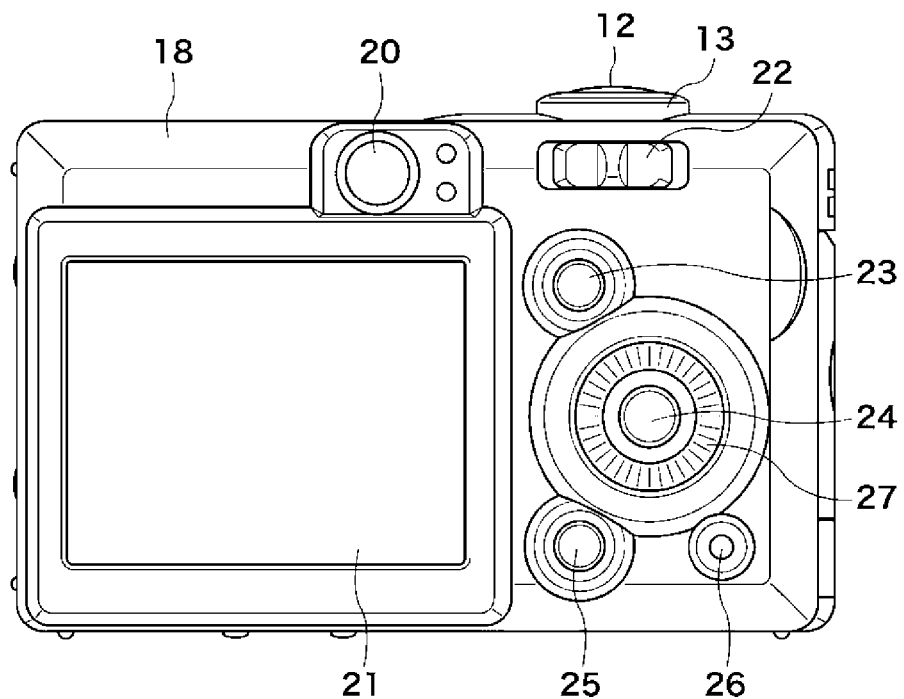
FIG. 3 is a back view showing the digital camera shown in FIG. 1.
Figure 4:
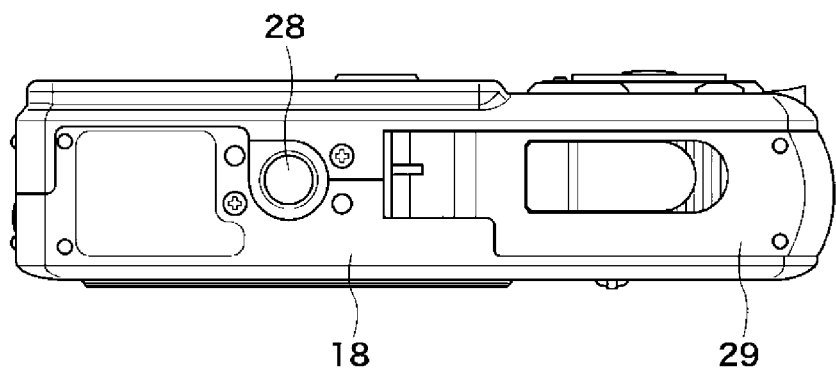
FIG. 4 is a bottom view showing the digital camera shown in FIG. 1.

FIG. 1 is an external perspective view showing a digital camera seen from a front side under a power-off condition as an embodiment of an image pickup apparatus that is provided with a lens barrel according to the present invention. FIG. 2 is an external perspective view showing the digital camera shown in FIG. 1 under a power-on condition. FIG. 3 is a back view showing the digital camera shown in FIG. 1. FIG. 4 is a bottom view showing the digital camera shown in FIG. 1.

As shown in FIG. 1 and FIG. 2, the digital camera 18 of this embodiment is provided with a zoom drive mechanism that moves a lens barrel 19 between a taking position and a retracted position in an optical axis direction to change magnification. A finder 16 for determining composition of a subject, an auxiliary light source 15 for photometric measurement and distance measurement, an electric flash 17, and the lens barrel 19 are mounted on a front side of the digital camera 18. A release button 12, a power supply change button 14, and a zoom switch 13 are arranged on an upper surface of the digital camera 18.

As shown in FIG. 3, a finder eyepiece 20, a display 21 such as an LCD, and operation buttons 22 through 27 are arranged on a back surface of the digital camera 18. As shown in FIG. 4, a tripod fitting part 28, a memory card drive 42 (see FIG. 5), and a cover 29 of a battery insert portion (not shown) are arranged on a bottom surface of the digital camera 18.

Figure 5:
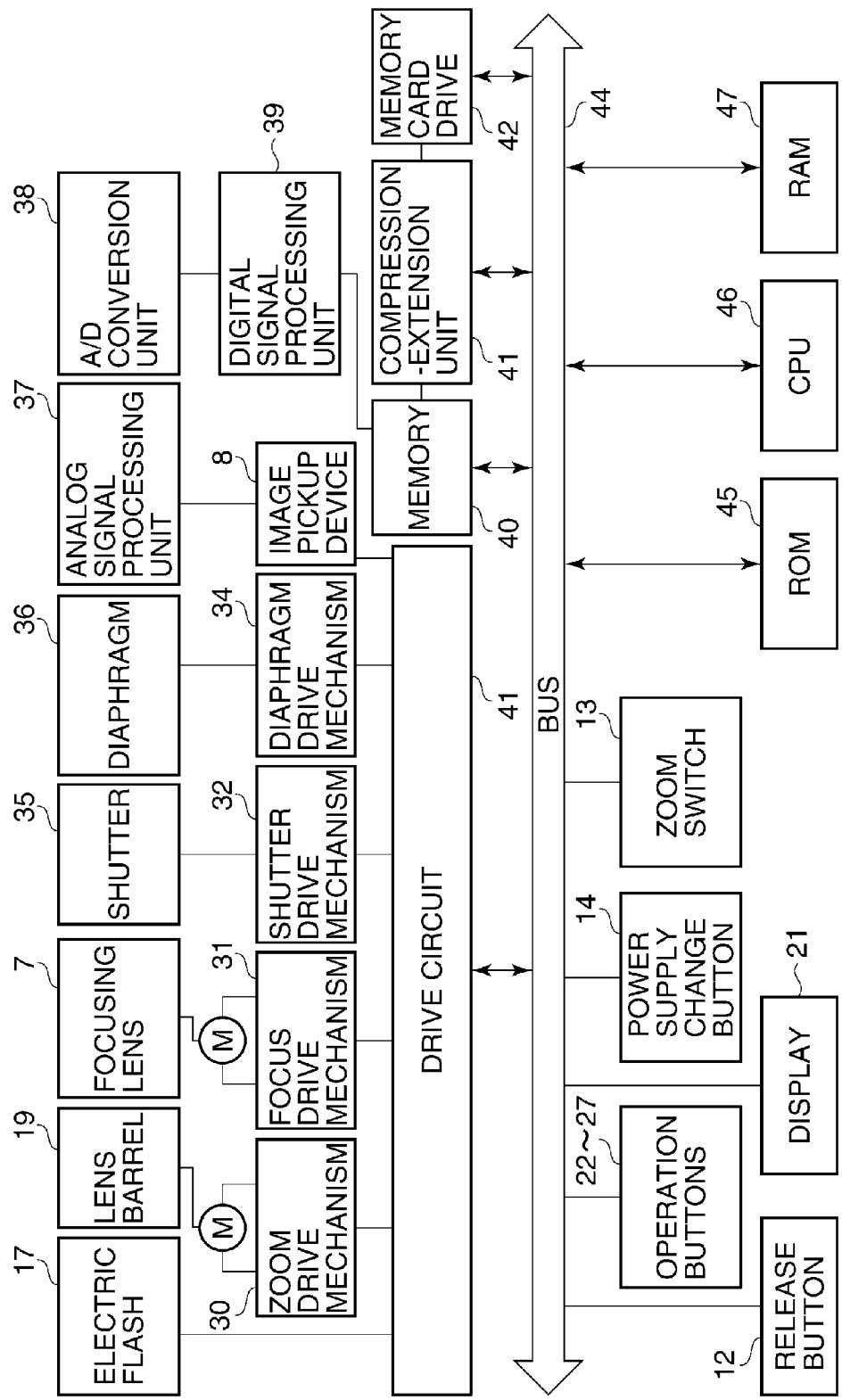
FIG. 5 is a block diagram schematically showing a control system of the digital camera shown in FIG. 1.

FIG. 5 is a block diagram schematically showing a control system of the digital camera 18 of the embodiment.

A CPU 46, a ROM 45, a RAM 47, the release button 12, the operation buttons 22 through 27, the display 21, the power supply change button 14, the zoom switch 13, a memory 40, a compression-extension unit 41, the memory card drive 42, and a drive circuit 43 are connected to a bus 44.

A zoom drive mechanism 30 that drives the lens barrel 19 for zooming, a focus drive mechanism 31 that drives a focusing lens 7, a shutter drive mechanism that drives a shutter 35, and a diaphragm drive mechanism 34 that drives a diaphragm 36 are connected to the drive circuit 43.

An image pickup device 8 such as a CCD sensor, a CMOS sensor, etc. and the electric flash 17 are also connected to the drive circuit 43. Each unit connected to the drive circuit 43 is controlled based on the signal from the CPU 46 through the drive circuit 43.

The ROM 45 stores various control programs etc., and the RAM 47 stores data required of the various control programs. An analog signal processing unit 37 applies an analog process to the image data outputted from the image pickup device 8, and outputs the processed image data to an A/D conversion unit 38.

The A/D conversion unit 38 converts the analog data captured from the image pickup device 8 into digital data, and outputs the converted data to a digital signal processing unit 39. The digital signal processing unit 39 applies a predetermined process to the digital data converted by the A/D conversion unit 38, and outputs it to the memory 40 as image data.

The compression-extension unit 41 applies a compression process like JPEG or TIFF to the image data stored in the memory 40 in response to an operation of the operation button 23. Then, the processed data is outputted and is stored into the memory card set to the memory card drive 42.

The compression-extension unit 41 applies an expansion process to the image data stored in the memory 40 or the image data stored in the memory card. Then, the processed image data can be displayed on the display 21 via the bus 44. When a user looks at the image displayed on the display 21 and determines that it is unnecessary, the user can erase the image data by operating the operation button 24.

Next, the configuration of the lens barrel 19 will be described with reference to FIG. 6 through FIG. 12.

Figure 6:
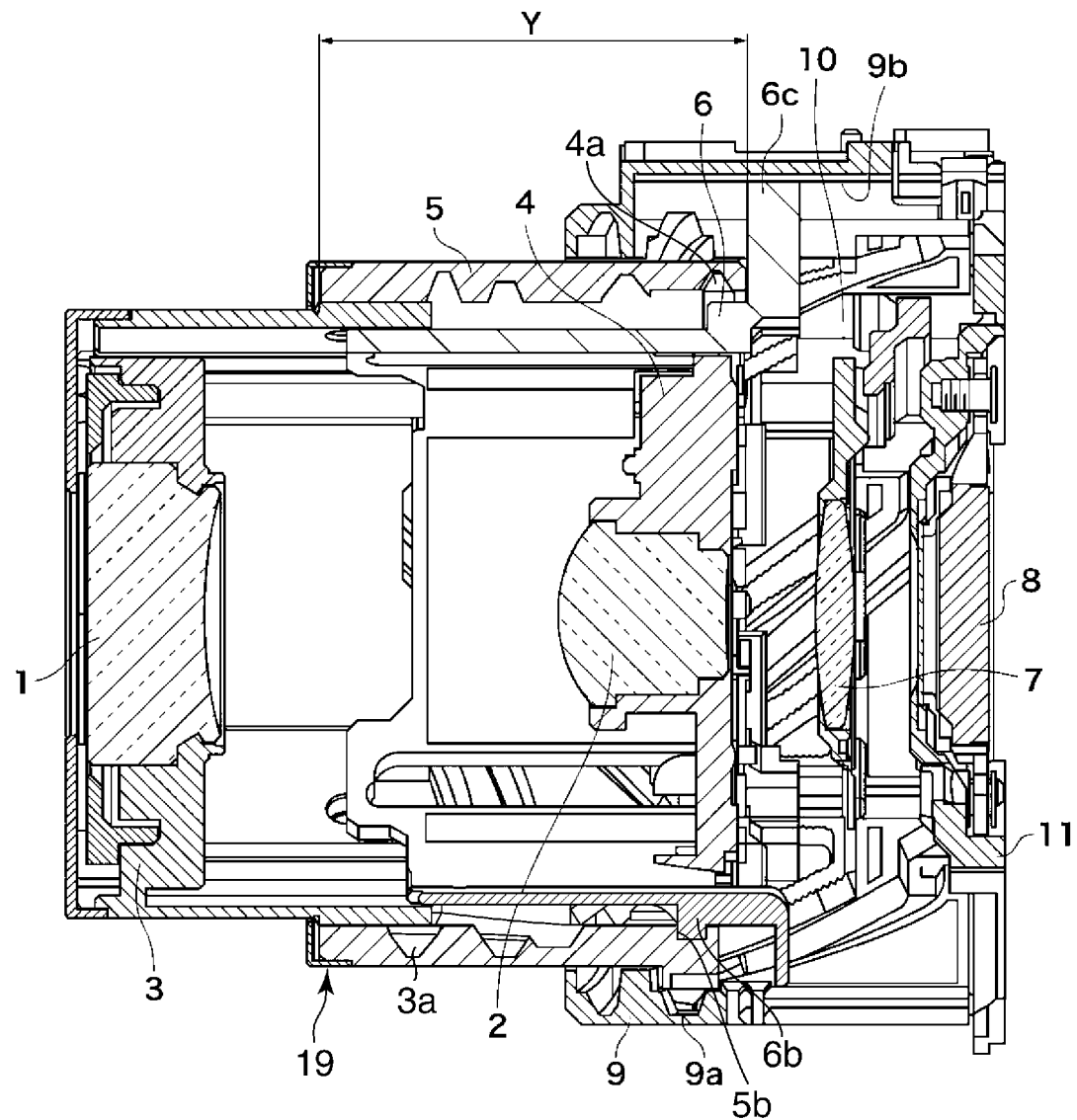
FIG. 6 is a sectional view showing the digital camera shown in FIG. 1 under a condition where the lens barrel is in a WIDE position.
Figure 7:
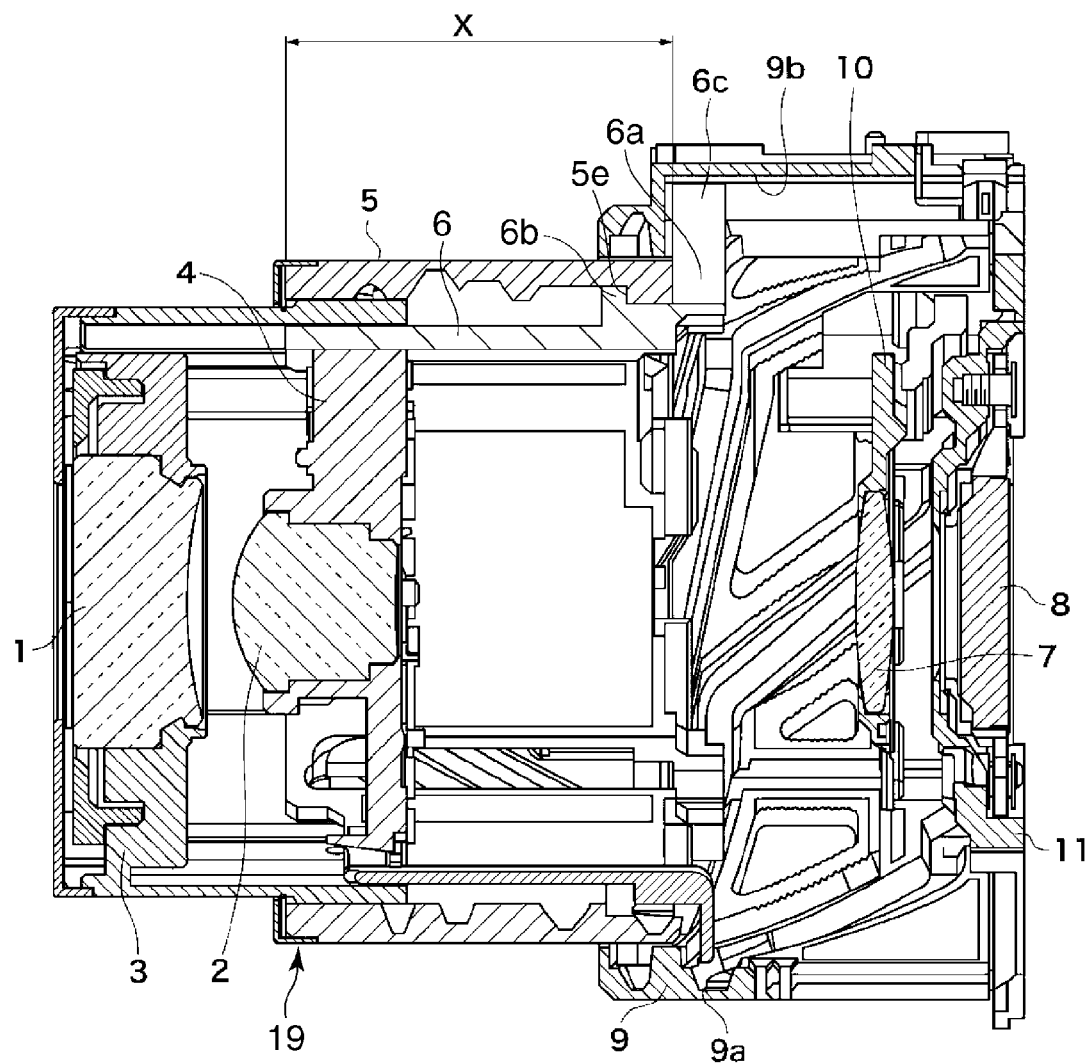
FIG. 7 is a sectional view showing the digital camera shown in FIG. 1 under a condition where the lens barrel is in a TELE position.

FIG. 6 is a sectional view showing the lens barrel 19 in a WIDE position (a wide-angle position). FIG. 7 is a sectional view showing the lens barrel 19 in a TELE position (a telephoto position).

As shown in FIG. 6 and FIG. 7, the lens barrel 19 is provided with a first lens holding frame 3 holding a first lens 1, and a second lens holding frame 4 holding a second lens 2 arranged at the side of the image surface (the side of the image pickup device 8) rather than the first lens 1.

The first lens holding frame 3 and the second lens holding frame 4 have follower pins 3a and 4a that follow a cam groove 5c (see FIG. 12) formed on an inner surface of the cam barrel 5. This follower pin corresponds to an example of the follower part of the present invention. The first lens holding frame 3 and the second lens holding frame 4 are held so that they can move linearly in the optical axis direction under a condition where the rotations are regulated by a rectilinear barrel 6 arranged inside the cam barrel 5. The rectilinear barrel 6 corresponds to an example of the rectilinear movement regulating member of the present invention. Here, each of the first lens holding frame 3 and the second lens holding frame 4 corresponds to an example of the lens holding member of the present invention.

The cam barrel 5 has a follower pin 5d (see FIG. 8) that follows a cam groove 9a formed on the inner surface of a fixed barrel 9, and moves in the optical axis direction while rotating by power transferred from the zoom drive mechanism 30. The rectilinear barrel 6 has a rectilinear key 6c that engages with a rectilinear groove 9b formed on the inner surface of the fixed barrel 9, and moves linearly in the optical axis direction under a condition where a rotation is regulated while the rectilinear key 6c is guided by the rectilinear groove 9b.

A third lens holding frame 10 holding a third lens 7 is arranged between the second lens holding frame 4 and the image pickup device 8, and the image pickup device 8 is held by an image-pickup-device-holding frame 11 fixed to the fixed barrel 9. It should be noted that the third lens 7 acts as the focusing lens in this embodiment.

Since the zoom drive mechanism 30 rotates the cam barrel 5, the cam barrel 5 extends in the optical axis direction, and the first lens holding frame 3 and the second lens holding frame 4 move forward (i.e., to the subject side) in the optical axis direction. At this time, the rectilinear barrel 6 is connected to the cam barrel 5 by a bayonet connection, and moves linearly together with the cam barrel 5 in the optical axis direction.

Figure 8:
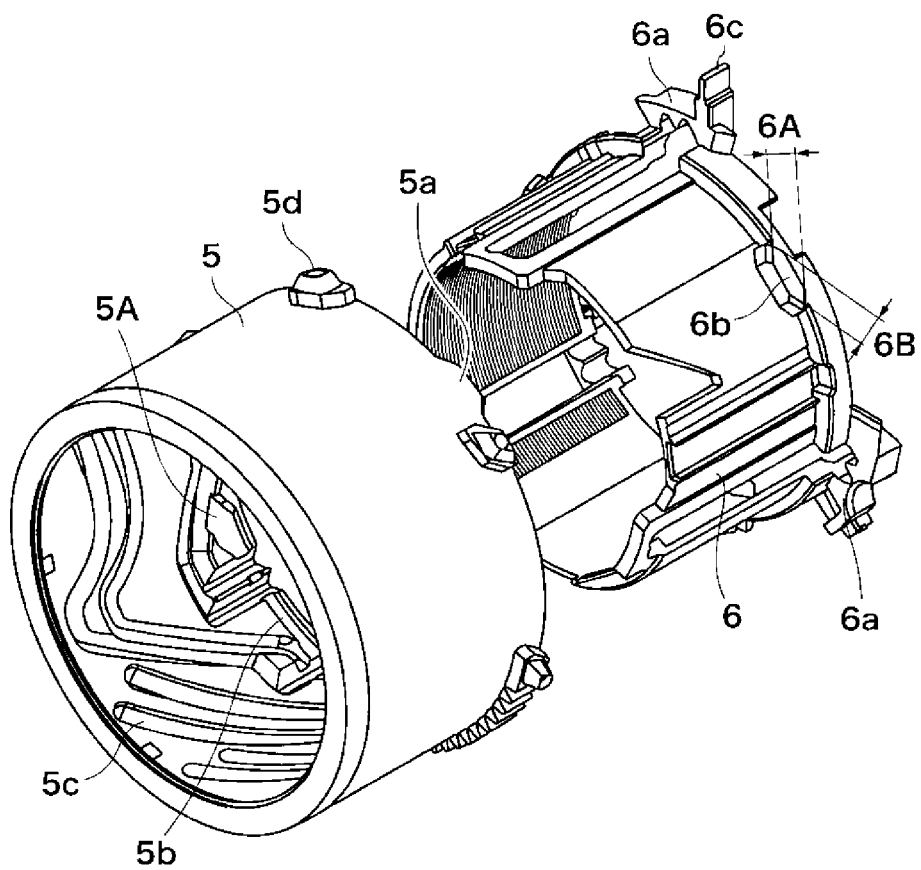
FIG. 8 is an exploded perspective view showing a cam barrel and a rectilinear barrel of the lens barrel shown in FIG. 6.
Figure 12:
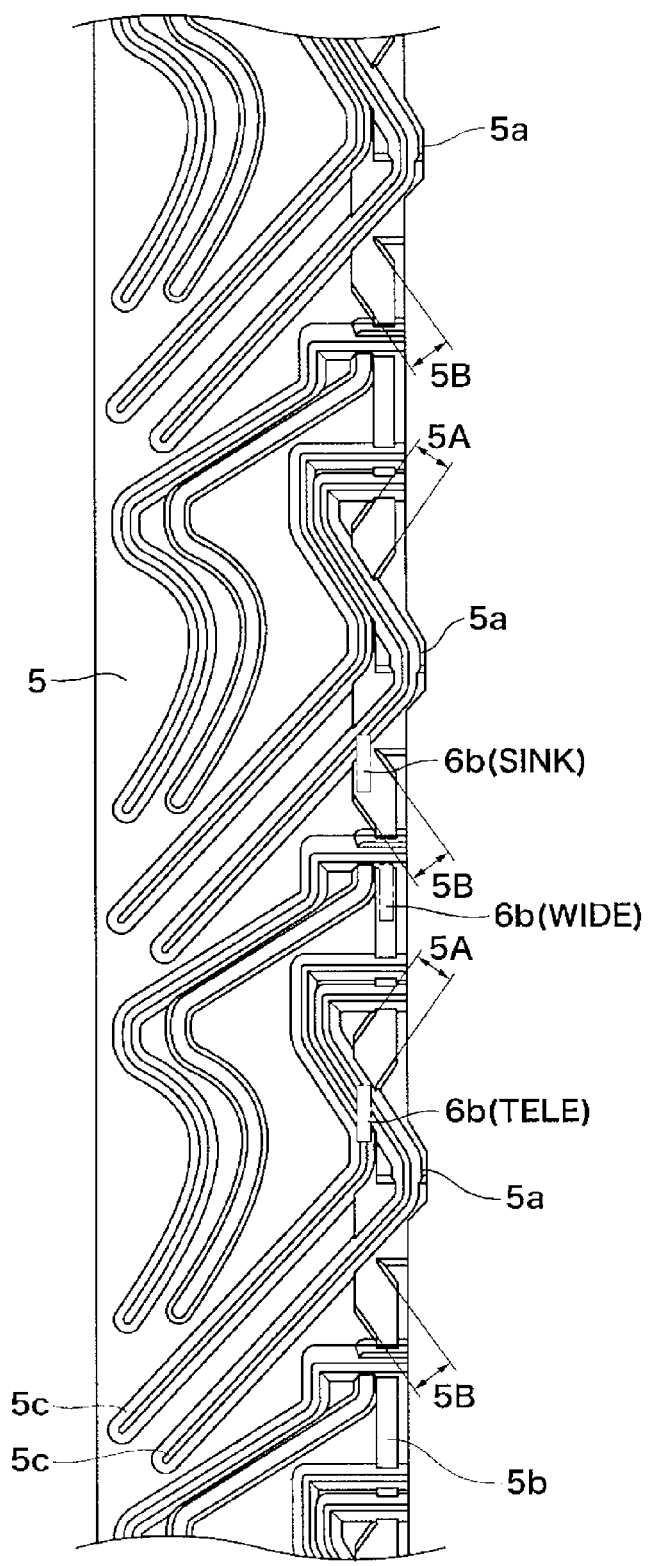
FIG. 12 is a development view showing an inner circumference of the cam barrel included in the lens barrel shown in FIG. 6.

Here, in this embodiment, as shown in FIG. 8 and FIG. 12, three cam pieces 5a that are extended to the image surface side in the optical axis direction are formed on the edge at the image surface side of the cam barrel 5 at nearly regular intervals in the circumferential direction. It should be noted that three rectilinear ribs 6a are formed on an outer edge at the image surface side of the rectilinear barrel 6 at nearly regular intervals in the circumferential direction. The rectilinear ribs 6a do not always engage with the cam pieces 5a.

Then, in this embodiment, the cam barrel 5 relatively moves with respect to the rectilinear barrel 6 in the optical axis direction according to the bayonet connection between the cam barrel 5 and the rectilinear barrel 6 mentioned later. It should be noted that the cam pieces 5a may engage with the rectilinear ribs 6a in the circumferential direction so that the cam engagement relatively moves the cam barrel 5 with respect to the rectilinear barrel 6 in the optical axis direction.

In the retracted position (not shown) of the lens barrel 19, the cylindrical parts of the cam barrel 5 and the rectilinear barrel 6 are almost overlapped. In the WIDE position (FIG. 6) of the lens barrel 19, the cylindrical part of the cam barrel 5 slightly deviates from the cylindrical part of the rectilinear barrel 6 in the optical axis direction. In the TELE position (FIG. 7) of the lens barrel 19, the cylindrical parts of the cam barrel 5 and the rectilinear barrel 6 are almost overlapped.

Figure 9A:
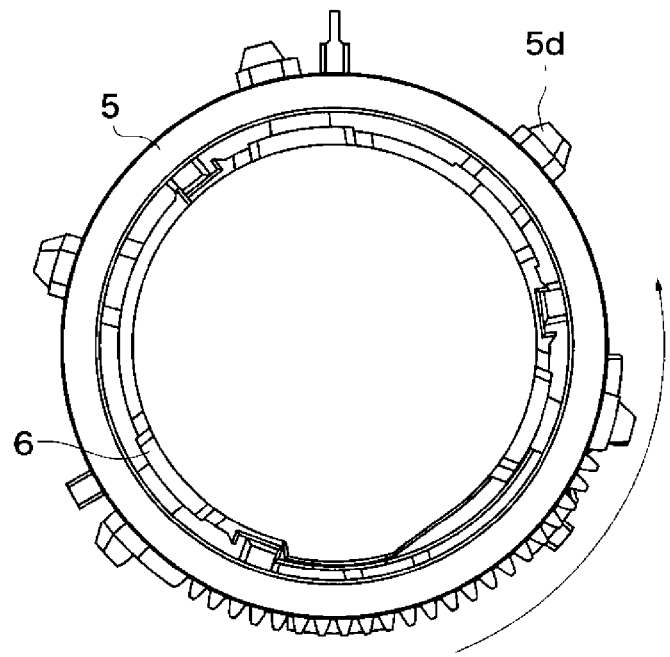
FIG. 9A is a view showing a positional relationship between the cam barrel and the rectilinear barrel of the lens barrel shown in FIG. 6 viewed in the optical axis direction in a retracted position.
Figure 9B:
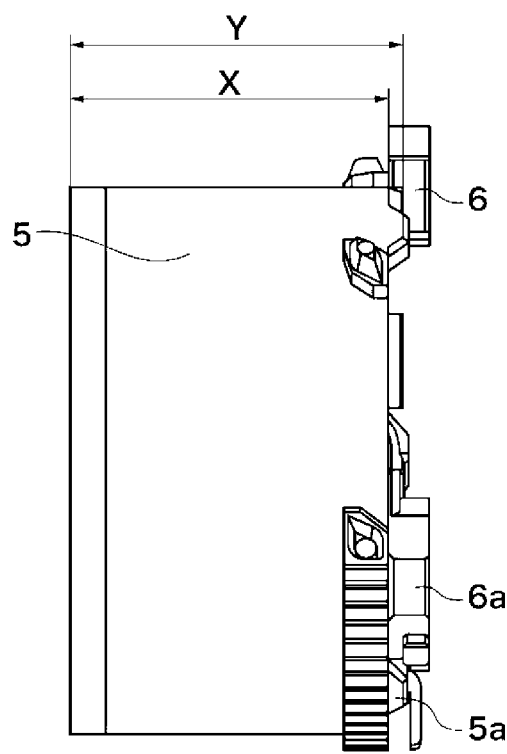
FIG. 9B is a side view showing a positional relationship between the cam barrel and the rectilinear barrel of the lens barrel shown in FIG. 6 in the retracted position.

The operation of the lens barrel 19 will be described with reference to FIG. 9A through FIG. 11B. FIG. 9A is a view showing a positional relationship between the cam barrel 5 and the rectilinear barrel 6 of the lens barrel viewed in the optical axis direction in the retracted position. FIG. 9B is a side view of FIG. 9A.

As shown in FIG. 9A and FIG. 9B, in the retracted position of the lens barrel 19, the cylindrical parts of the cam barrel 5 and the rectilinear barrel 6 are almost overlapped, and the cam pieces 5a of the cam barrel 5 are arranged so as to face the rectilinear ribs 6a of the rectilinear barrel 6 in the circumferential direction. This decreases the length of the lens barrel 19 in the optical axis direction in the retracted position, which decreases the camera thickness under the lens retracted condition.

Figure 10A:
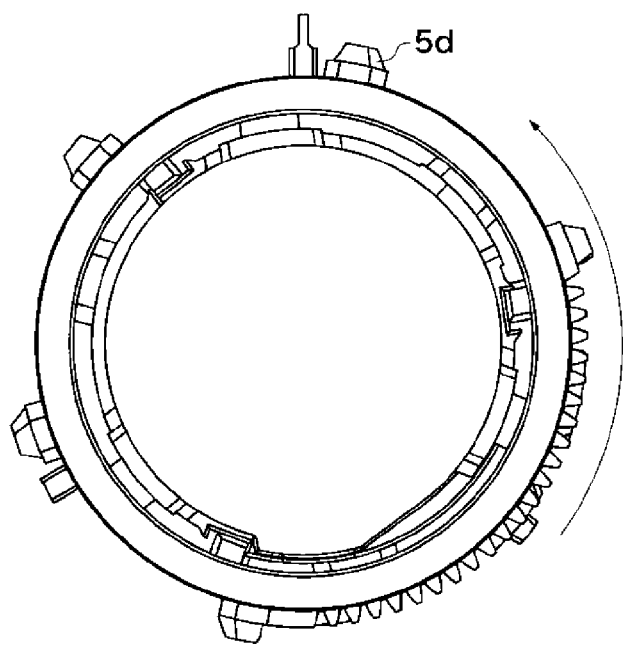
FIG. 10A is a view showing a positional relationship between the cam barrel and the rectilinear barrel of the lens barrel shown in FIG. 6 viewed in the optical axis direction in the WIDE position.
Figure 10B:
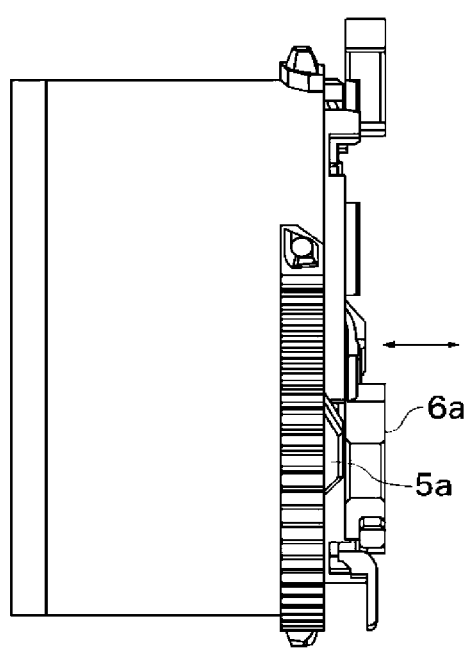
FIG. 10B is a side view showing a positional relationship between the cam barrel and the rectilinear barrel of the lens barrel shown in FIG. 6 in the WIDE position.

FIG. 10A is a view showing a positional relationship between the cam barrel 5 and the rectilinear barrel 6 of the lens barrel 19 viewed in the optical axis direction in the WIDE position (FIG. 6). FIG. 10B is a side view of FIG. 10A.

As shown in FIG. 10A and FIG. 10B, in the WIDE position of the lens barrel 19, the rectilinear ribs 6a of the rectilinear barrel 6 run onto the cam pieces 5a of the cam barrel 5. Accordingly, the rectilinear barrel 6 moves relatively to the image surface side with respect to the cam barrel 5, and the cylindrical part of the cam barrel 5 slightly deviates from the cylindrical part of the rectilinear barrel 6 in the optical axis direction.

Figure 11A:
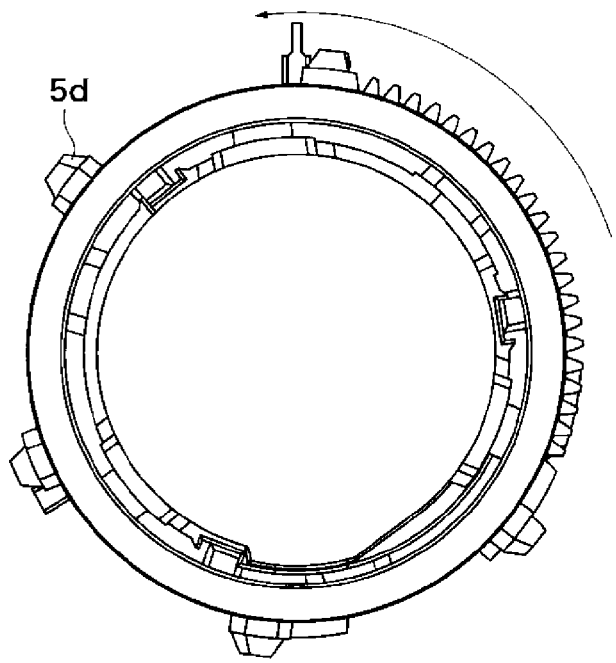
FIG. 11A is a view showing a positional relationship between the cam barrel and the rectilinear barrel of the lens barrel shown in FIG. 6 viewed in the optical axis direction in the TELE position.
Figure 11B:
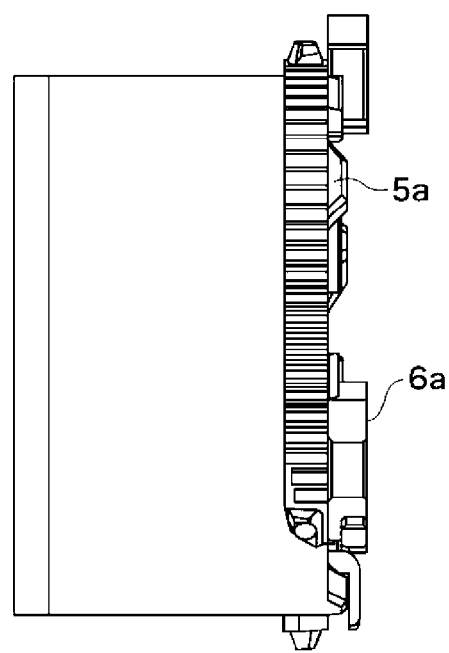
FIG. 11B is a side view showing the positional relationship between the cam barrel and the rectilinear barrel in the lens barrel shown in FIG. 6 in the TELE position.

FIG. 11A is a view showing a positional relationship between the cam barrel 5 and the rectilinear barrel 6 of the lens barrel 19 viewed in the optical axis direction in the TELE position (FIG. 7). FIG. 11B is a side view of FIG. 11A.

As shown in FIG. 11A and FIG. 11B, in the TELE position of the lens barrel 19, the cam pieces 5a of the cam barrel 5 get over the rectilinear ribs 6a of the rectilinear barrel 6, and the cam pieces 5a of the cam barrel 5 are arranged so as to face the rectilinear ribs 6a of the rectilinear barrel 6 in the circumferential direction. Accordingly, the cylindrical parts of the cam barrel 5 and the rectilinear barrel 6 are almost overlapped.

It should be noted that the first lens holding frame 3 tends to move to the front end position at the subject side when the lens barrel 19 is in the TELE position, in general. In that case, since the rectilinear barrel 6 moves to the subject side with respect to the cam barrel 5, the rectilinear barrel 6 accurately regulates the rotation of the first lens holding frame 3. In the TELE position of the lens barrel 19, the first lens 1 and the second lens 2 approach relatively, and move to the front end positions at the subject side with respect to the cam barrel 5.

As shown in FIG. 8, three bayonet convex parts 6b are formed on the rectilinear barrel 6 at nearly regular intervals in the circumferential direction. A helicoid part 6A is formed on one side of the bayonet convex part 6b in the circumferential direction, and a helicoid part 6B is formed on the other side thereof.

FIG. 12 is a development view showing the inner surface of the cam barrel 5. As shown in FIG. 12, a circumferential groove 5b to which the bayonet convex part 6b follows when the cam barrel 5 rotates is extended and formed on the inner surface of the cam barrel 5 in the end area at the image surface side in the circumferential direction. In a middle area of the circumferential groove 5b, the helicoid grooves 5A and 5B to which the bayonet convex part 6b follows when the cam barrel 5 rotates are formed.

The helicoid groove 5A is formed so as to correspond to the helicoid part 6A of the bayonet convex part 6b, and extends aslant in a direction away from the circumferential groove 5b toward the subject side. On the other hand, the helicoid groove 5B is formed so as to correspond to the helicoid part 6B of the bayonet convex part 6b, and extends aslant in a direction away from the circumferential groove 5b toward the subject side and away from the helicoid groove 5A. That is, the helicoid grooves 5A and 5B are symmetrically arranged with respect to the circumferential groove 5b, and are arranged aslant so as to separate to each other towards the subject side.

The most distant edge of the helicoid groove 5B from the circumferential groove 5b is a following start point for the bayonet convex part 6b to the helicoid groove 5B. The most distant edge of the helicoid groove 5A from the circumferential groove 5b is a following end point for the bayonet convex part 6b to the helicoid groove 5A.

Then, in the retracted position of the lens barrel 19, the bayonet convex part 6b is arranged at the following start point of the helicoid groove 5B, and the cam barrel 5 and the rectilinear barrel 6 are connected by the bayonet connection. At this time, as described in FIG. 9A and FIG. 9B, the cylindrical parts of the cam barrel 5 and the rectilinear barrel 6 are almost overlapped, and the cam pieces 5a of the cam barrel 5 are arranged so as to face the rectilinear ribs 6a of the rectilinear barrel 6 in the circumferential direction.

Next, the bayonet convex part 6b follows along with the helicoid groove 5B as the cam barrel 5 rotates relatively to the rectilinear barrel 6, and reaches the circumferential groove 5b. At this time, the lens barrel 19 is in the WIDE position, as described in FIG. 10A and FIG. 10B, the rectilinear barrel 6 moves to the image surface side with respect to the cam barrel 5, and the cylindrical part of the cam barrel 5 slightly deviates from the cylindrical part of the rectilinear barrel 6 in the optical axis direction.

When the lens barrel 19 is in the WIDE position, a distance between the first lens 1 and the second lens 2 in the optical axis direction is the largest, and the second lens holding frame 4 is in the position closest to the image surface with respect to the cam barrel 5.

Here, in this embodiment, the cam groove 5c of the cam barrel 5 to which the follower pin of the second lens holding frame 4 follows in the WIDE position of the lens barrel 19 is extended to the inner surface of the cam piece 5a. Therefore, a part of the cam groove 5c is formed on the inner surface of the cam barrel 5. This lengthens the strokes of the first lens 1 and the second lens 2 by the difference (Y–X) in FIG. 9. As a result, the magnification of the camera can be increased.

Then, when the cam barrel 5 rotates relatively with respect to the rectilinear barrel 6, the bayonet convex part 6b enters into the helicoid groove 5A from the circumferential groove 5b, follows the helicoid groove 5A, and reaches the following end point of the helicoid groove 5A. At this time, the lens barrel 19 is in the TELE position, the cam pieces 5a of the cam barrel 5 get over the rectilinear ribs 6a of the rectilinear barrel 6, and the cam pieces 5a are arranged so as to face the rectilinear ribs 6a in the circumferential direction, the cylindrical parts of the cam barrel 5 and the rectilinear barrel 6 are almost overlapped as described in FIG. 11. It should be noted that operations of the lens barrel 19 from the TELE position to the retracted position will be reverse order to the above operations.

As described above, in this embodiment, since the follower pins of the first lens holding frame 3 and the second lens holding frame 4 are not released from the cam groove 5c of the cam barrel 5 during the zoom operation, the stable zoom operation can be kept.

In the retracted position of the lens barrel 19, since the cam pieces 5a of the cam barrel 5 are arranged so as to face the rectilinear ribs 6a of the rectilinear barrel 6 in the circumferential direction, the length of the lens barrel 19 in the optical axis direction in the retracted position can be shortened, which can thin the camera.

Since the strokes of the first lens 1 and the second lens 2 in the optical axis direction lengthen, the magnification of the camera can be increased.

Since the cam barrel 5 only requires to form the cam pieces 5a on which the cam grooves 5c are formed on the inner surface and to form the grooves 5b, 5A, and 5B to which the bayonet convex parts 6b of the rectilinear barrel 6 follow when the cam barrel 5 rotates, the structure of the lens barrel 19 can be simplified.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-081921, filed on Mar. 31, 2010, which is hereby incorporated by reference herein in its entirety.

What is claimed is:

1. A lens barrel that is moved in an optical axis direction between a picture taking position and a retracted position by a zoom drive mechanism, comprising:
   a lens holding member configured to hold a lens and having a follower part;
   a rectilinear movement regulating member configured as a barrel that regulates relative rotation of said lens holding member and having a convex part and a rib, both of which being formed on an outside surface of said rectilinear movement regulating member;
   a cam barrel having a first cam groove with which the follower part is engaged, a second cam groove with which the convex part is engaged, and a cam piece extending from an edge surface at an image surface side of said cam barrel, wherein said first and second cam groove are formed on an inner surface of the cam barrel, and a part of the first cam groove being formed on an inner surface of the cam piece,
   wherein said rib is arranged in the image surface side than said convex part,
   an outer surface of the cam piece is arranged so as to face the rib,
   said rectilinear movement regulating member moves in the optical axis direction together with said cam barrel by the engagement of the convex part and the second cam groove, and
   said rectilinear movement regulating member moves relatively to said cam barrel by the convex part following along with the second groove as said cam barrel rotates.

2. The lens barrel according to claim 1, wherein the cam piece engages with the rib formed on said rectilinear movement regulating member in the circumferential direction, and the cam piece is formed so that the rib runs onto the cam piece when said rectilinear movement regulating member moves in the optical axis direction relatively to said cam barrel.

3. The lens barrel according to claim 1, wherein the picture taking position includes a telephoto position and a wide-angle position, a cylindrical part of said cam barrel and a cylindrical part of said rectilinear movement regulating member are overlapped in the retracted position and in the telephoto position, and the cylindrical part of said cam barrel deviates from the cylindrical part of said rectilinear movement regulating member in the optical axis direction in the wide-angle position.

4. The lens barrel according to claim 1, wherein the picture taking position includes a telephoto position and a wide-angle position, and the follower part of said lens holding member engages with the part of the first cam groove formed on the inner surface of the cam piece in the wide-angle position.

* * * * *